United States Patent [19]
Kinstler

[11] 3,748,362
[45] July 24, 1973

[54] PRODUCTION OF 4-NITROSODIPHENYLAMINE

[75] Inventor: Robert C. Kinstler, Somerville, N.J.

[73] Assignee: American Cyanamid Company, Stamford, Conn.

[22] Filed: Apr. 13, 1970

[21] Appl. No.: 27,880

[52] U.S. Cl. .................................. 260/576, 260/701
[51] Int. Cl. ............................................. C07c 87/50
[58] Field of Search ............................. 260/576, 577

[56] References Cited
UNITED STATES PATENTS
2,782,235  2/1957  Lantz et al. ........................... 260/576
3,429,924  2/1969  Ellerbrook et al. .................. 260/576

Primary Examiner—Joseph Rebold
Assistant Examiner—C. F. Warren
Attorney—Philip Mintz

[57] ABSTRACT

N-nitrosodiphenylamine is rearranged to 4-nitrosodiphenylamine of high purity by dissolving it in a water-immiscible non-polar solvent such as toluene and reacting it with a solution of dry HCl in anhydrous methanol, thereby producing 4-nitrosodiphenylamine hydrochloride while dissolving most of the by-product impurities in the toluene, neutralizing the resulting slurry with strong aqueous alkali to a pH above about 11.5, drawing off the toluene solution containing the impurities, and adding a limited quantity of acid to the aqueous residue to precipitate a pure 4-nitrosodiphenylamine therefrom while retaining residual alkali-soluble impurities in solution.

7 Claims, 1 Drawing Figure

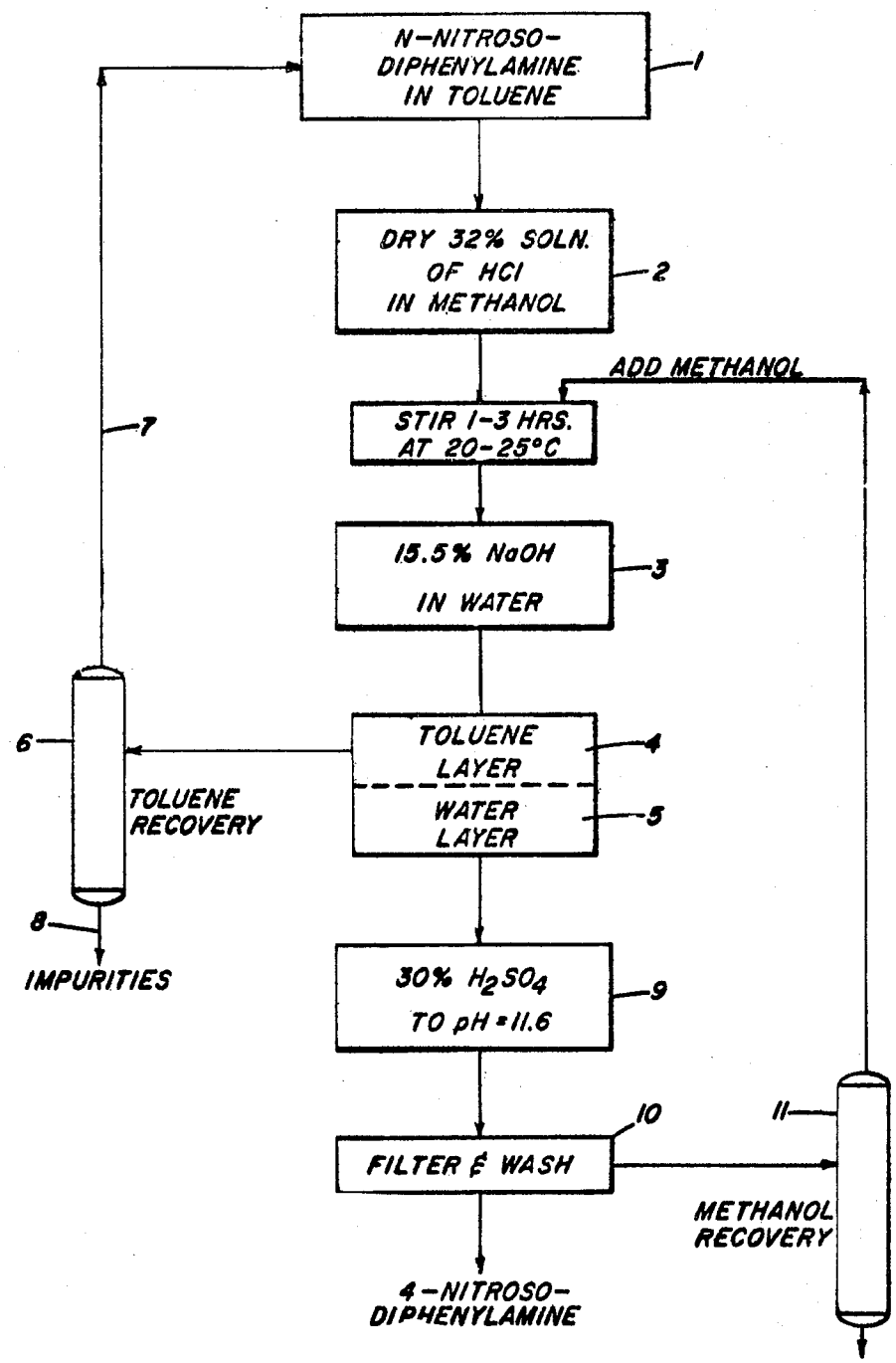

PRODUCTION OF 4-NITROSODIPHENYLAMINE

This invention relates to a process for the production of 4-nitrosodiphenylamine of high purity. More particularly, it is directed to a process for the manufacture of this material, which is hereinafter sometimes called 4-NDPA, by the rearrangement of N-nitrosodiphenylamine using solvents and reaction conditions such that the by-product impurities incidental to its manufacture are removed and a highly pure product is obtained in a very high yield.

4-nitrosodiphenylamine is an important intermediate used in the manufacture of N-phenyl-N'-alkyl-p-phenylene diamines, which are in wide commercial use as antiozonants for elastomers. For this purpose a 4-nitrosodiphenylamine of good purity is required. It is a principal object of the present invention to provide a process which will yield 4-NDPA of this purity directly, thus avoiding the necessity of further purification procedures.

A further object of the invention is to provide a process wherein 4-nitrosodiphenylamine is obtained from N-nitrosodiphenylamine in unusually high yields. Still further objects of the invention will become apparent from the following description of preferred embodiments thereof when taken with the attached drawing and the accompanying claims.

I have found that the above and other objects can be accomplished by rearranging N-nitrosodiphenylamine to 4-nitrosodiphenylamine by the following procedure:

The N-nitrosodiphenylamine is first dissolved in a water-immiscible non-polar solvent such as a mononuclear aromatic hydrocarbon solvent. This solution is then agitated with a solution of dry hydrogen chloride in a water-free but water-soluble aliphatic monohydric alcohol such as methanol or ethanol, thereby bringing about the desired rearrangement while simultaneously dissolving by-product impurities from the reaction in the non-polar solvent. The resulting reaction mixture is then neutralized by mixing it with an excess quantity of strong aqueous alkali, such as an aqueous alkali metal hydroxide solution, using quantities sufficient to attain a strongly alkaline pH which should be above about 11.5. When this is done the neutralized mixture can be separated into an upper organic solvent layer containing the bulk of the impurities formed during the rearrangement reaction and a lower aqueous layer containing the 4-nitrosodiphenylamine as its alkali metal salt. A minor quantity of impurities is ordinarily also dissolved in this aqueous solution.

In order to recover the 4-NDPA separately from the impurities the material of the aqueous layer is neutralized by careful addition of a limited quantity of mineral acid. This acid is added in a quantity sufficient to cause precipitation of the 4-nitrosodiphenylamine from its alkali metal salt, but insufficient to cause or permit the resulting slurry to become acidified to the point where its dissolved impurities are also precipitated. The 4-NDPA product can thereafter be recovered in pure form by separating it from the liquid phase of the slurry, which contains the impurities in solution; this is preferably done by filtering and washing.

The novel features and advantages of the invention will be evident from a consideration of the attached drawing, wherein a specific embodiment is diagrammatically shown. Referring to this drawing a solution of N-nitrosodiphenylamine in toluene, which is preferably a 40-80 percent solution, is depicted at 1. A 15-35 percent solution of dry hydrogen chloride in anhydrous methanol, which is preferably a 32 percent solution, is shown at 2. The two solutions are mixed together with stirring and are maintained at a temperature within the range of about 20-40° C. and the mixing is continued until substantially all of the N-nitrosodiphenylamine has reacted. This usually requires about 1.5-3 hours when a reaction temperature of about 20-25° C. is used.

Ordinarily about 96 percent of the N-nitrosodiphenylamine is converted into 4-nitrosodiphenylamine hydrochloride by this procedure, the remainder being decomposed into black, tarry impurities which cannot be tolerated in the final product. Most of the hydrochloride salt of 4-NDPA precipitates during the reaction, and it is therefore convenient to introduce additional methanol to maintain the slurry in a fluid condition; this is indicated on the drawing by line 12.

After the rearrangement has been completed it is necessary to neutralize the acidity of the reaction mixture and recover the 4-nitrosodiphenylamine. In accordance with the present invention this is done in such a manner as to separate it substantially completely from the accompanying impurities. A strong alkali, such as an alkali metal hydroxide, is used for the neutralization in the form of an aqueous solution, preferably but not necessarily a 10-20 percent aqueous sodium hydroxide solution, and such a solution is indicated on the drawing by reference numeral 3. This is added to the reaction mixture in excess, and under conditions as such that the product is transported rapidly from acidic to highly alkaline pH. Such alkaline conditions, wherein the pH is above about 11 and preferably above 11.5, are then maintained until the product is eventually isolated by filtration and washed free of water-soluble impurities. I have found that a superior 4-NDPA, having the advantageous characteristics described, is obtainable by this procedure.

Upon addition of the aqueous alkali solution and standing there results a clean liquid mixture with two separate layers. The upper non-aqueous layer, indicated on the drawing as a toluene layer 4, contains the bulk of the impurities. The lower aqueous alkaline layer, indicated on the drawing as a water layer 5, contains the 4-nitrosodiphenylamine dissolved as its alkali metal salt and also contains in solution a minor quantity of alkali-soluble impurities. These two layers are separated by decantation and the toluene solution is preferably passed to a still 6 in which it is distilled to recover the solvent for reuse, as indicated by line 7, while the impurities are discarded through a line 8.

The material of the water layer 5 is treated by admixture with a limited quantity of a mineral acid, such as a 30 percent aqueous sulphuric acid solution indicated at 9, under conditions which are controlled carefully in such a manner as to cause precipitation of the 4-nitrosodiphenylamine from its alkali metal salt without permitting the resulting slurry to become acidified to an extent such that the dissolved impurities are also precipitated. This is done by adding only sufficient acid to cause precipitation of the 4-NDPA from its alkali metal salt. This product precipitates completely between pH 11.5 and 12.5, and therefore the addition of mineral acid is preferably stopped when the pH drops below about 11.6. By conducting the precipitation in this manner practically all of the impurities present in the aqueous phase are retained in the solution, and are separated from the 4-NDPA in the subsequent filtration and washing steps.

The final product may be separated and recovered by any known or preferred filtration and washing procedure, as in a plate and frame filter press. This is indicated on the drawing by reference numeral 10. The filtrate is preferably introduced into a distilling column 11, wherein the methanol is separated from the impurities and recovered for reuse.

It will be understood that the above-described process can be varied considerably within the scope of the invention in its broader aspects. Thus, any water-immiscible non-polar solvent for the N-nitrosodiphenylamine may be used, the cheaper commercial solvents such as benzene, toluene, xylene, monochlorobenzene, trichloroethylene, hexane, cyclohexane, carbon tetrachloride and the like being preferred. Any solvent of this type which is capable of dissolving N-nitrosodiphenylamine will also dissolve the bulk of its decomposition impurities, and therefore may be used. Mononuclear aromatic hydrocarbon solvents such as benzene and toluene are the preferred solvents because of their ready availability, high solvent power, low water solubility, and easy recovery by distillation.

The amount of water-immiscible solvent to be used may be varied within considerable limits. It should ordinarily be at least one-tenth of the weight of the N-nitrosodiphenylamine being used, and is usually within the range of about 0.3 to 1.5 times the weight of this material; solutions having a solids content of about 40–80 percent by weight are therefore preferably employed. Larger amounts of non-polar solvents could of course be used, but such larger amounts are unnecessary and impractical from an economic standpoint. The solvents are used to dissolve the N-nitrosodiphenylamine, to extract the bulk of the impurities produced on its rearrangement, and to assist in effecting a clean and rapid rearrangement reaction.

Any water-soluble aliphatic monohydric alcohol may be used to dissolve the hydrogen chloride. Methanol and ethanol are preferred because of their availability and low cost, but any other water-soluble lower aliphatic alcohol or alcohol mixture could be used. Methanol is especially preferred because it can be easily recovered in anhydrous form by distillation from the aqueous mixtures resulting from the neutralization and filtration steps. The amount of alcohol to be used may be varied within wide limits; preferably the quantity employed is within the range of about 2 to 6 times the weight of the hydrogen chloride, and preferably a 15–35 percent HCl solution is used. The hydrogen chloride is employed in excess over the quantity required to effect the rearrangement of the N-nitrosodiphenylamine and form a hydrochloride with the conversion product; usually a ratio of from about 1.05 to 3.0 moles of HCl per mole of N-nitrosodiphenylamine is employed.

The rearrangement reaction should be carried out at a relatively low temperature in order to avoid the formation of excessive amounts of impurities. Temperatures of about 20°–40° C. are usually maintained. During the conversion the hydrochloride salt of 4-NDPA precipitates in large measure, although a portion remains dissolved in the liquid because of the lower aliphatic alcohol. The by-product impurities are held in solution by the water-immiscible non-polar solvent.

4-nitrosodiphenylamine is used in the preparation of N-phenyl-N'-alkyl-p-phenylene diamine antiozonants by a reductive alkylation process. It must therefore be substantially free from impurities, since these tend to drastically reduce the activity of the noble metal catalyst which is used. A representative hydrogenation test, by which the adverse effect of these impurities can be shown, is set forth hereinafter in Example 2.

The invention will be further described and illustrated by the following examples.

EXAMPLE 1

A stirred, glass-lined reaction vessel equipped with a cooling jacket and thermometer was charged with 610 parts of a 32 percent solution of hydrogen chloride in methanol (195 parts HCl or 5.34 moles). At a temperature of 22°–25° C., 1,405 parts of 50.5 percent N-nitrosodiphenylamine solution in toluene (3.61 moles) was added over a period of about 1 hour. The resulting brick-red slurry of 4-nitrosodiphenylamine hydrochloride was diluted with 90 parts of methanol and stirred for 1 hour at 20°–25° C. The slurry was then added at a steady rate to a vigorously stirred 15.5 percent NaOH solution containing 385 parts (9.62 moles) of NaOH. The temperature of the mixture increased to about 45° C. and a clean separation of the two liquid phases was obtained upon standing. The heavier aqueous phase containing the sodium salt of 4-nitrosodiphenylamine was separated by decantation. The organic (toluene) phase (660 parts) was found to contain 32 parts of black, tarry impurities on removal of the toluene. The aqueous phase was treated with 30 percent sulfuric acid until the pH dropped to 11.6. The resulting slurry of 4-nitrosodiphenylamine was stirred at 50° C. for 30 minutes, filtered and washed with water until free of salts. There was obtained 691 parts of dark blue crystalline product; melting range (Hershberg method) was 145.1° to 146.1°C.

EXAMPLE 2

Hydrogenation Test

The quality of 4-nitrosodiphenylamine is measured by two methods. The first, a melting range, is determined by the "capillary method" using a Hershberg melting point apparatus at a heating rate of about 1° C./minute. A high purity 4-NDPA has a melting range of 144°–146°C.

The second measurement of quality, which is more definitive, measures the rate of hydrogen absorption when the compound undergoes reductive alkylation, using acetone in the presence of a palladium catalyst under standard laboratory conditions. The test is sensitive to the impurities normally found in 4-NDPA. Samples of 4-NDPA prepared according to the process of this invention absorb a standard quantity of hydrogen (equivalent to 80 percent of the stoichiometric requirement for complete reductive alkylation) in less than 25 percent of the time required for 4-NDPA made according to previously known methods. The hydrogenation test has been demonstrated to be extremely accurate and sensitive in measuring quality of 4-NDPA and the results correlate with the more generally known but less specific melting point test. Highly purified samples of 4-NDPA, melting at 147° C., perform very well in this test, and in general samples having a melting range above 144° C. show fast hydrogen absorption. Samples having a melting range below 143° C. show significantly poorer results.

The equipment used is a Series 3910 Hydrogenation Apparatus made by Parr Instrument Co., Moline, Ill. The holding clamp and gas connector assembly are modified for insertion of a thermometer and a heating thimble for adjusting the temperature in the hydrogenation bottle.

A charge of 24.7 grams of dry 4-nitrosodiphenylamine is placed in the 500 ml. hydrogenation bottle along with 75 ml. of acetone, 0.25 gram of benzoic acid and 2.47 grams of 5 percent palladium-on-carbon catalyst. The bottle is clamped in the shaker apparatus and connected to a 4 liter gas reservoir, purged with hydrogen from the reservoir and the entire system pressurized with hydrogen to 40 psi. The shaker is started and the drop in hydrogen pressure with time is recorded. When the pressure drops below 30 psi, the shaker is stopped, the hydrogen reservoir refilled to 40 psi hydrogen, and the test continued. After an initial exotherm to about 80° C., the temperature is maintained at 80°–95° C. by admitting hot water to the heating thimble.

The quality of 4-NDPA can be determined by the reaction time required to observe a cumulative pressure drop of 25 psi hydrogen. Good quality 4-NDPA produced by the process of this invention shows a hydrogen absorption time of less than 30 min., while products made according to prior art methods require more than 2 hours for the same hydrogen absorption.

EXAMPLE 3

In accordance with the teachings of U.S. Pat. No. 3,429,924, a suspension of N-nitrosodiphenylamine (125 grams) in 180 ml. of n-butanol was prepared by dissolving the nitroso compound in the butanol at 70° C. followed by rapid cooling with vigorous agitation to 25° C. A portion of the slurry containing 63.5 grams of N-nitrosodiphenylamine (0.32 mole) was stirred at 25° C. and 82 ml. of a solution of hydrogen chloride in n-butanol (0.45 mole HCl) added over a period of 20 minutes. The yellow solids dissolved and later precipitated as the typical brick-red 4-NDPA hydrochloride. The reaction mixture was stirred at 25°–30° C. for 4 hours. The excess hydrogen chloride was neutralized by the addition of 155 ml. of sodium carbonate solution containing 0.14 equivalents of $Na_2CO_3$.

The slurry of the hydrochloride was then carefully neutralized with sodium carbonate solution to a pH of 6.5 to 7.0. The resulting slurry of 4-NDPA was filtered, washed with water and dried at 50°–60° C. The melting range of the product was 139.6°–142.0° C. The dried product was subjected to the test for hydrogen absorption rate in the manner described in the preceding example. The time for absorption of the standard amount of hydrogen was over 2 hours. By comparison, the product of Example 1 showed an absorption time of 15 minutes.

What I claim is:

1. A method of producing a 4-nitrosodiphenylamine of high purity which comprises the steps of:
   a. reacting under anhydrous conditions at about 20°–40° C. a solution of one mole of N-nitrosodiphenylamine in a water-immiscible non-polar solvent with a solution of about 1.05 to 3 moles of dry HCl in a water-free but water-soluble aliphatic monohydric alcohol and thereby converting the N-nitrosodiphenylamine to 4-nitrosodiphenylamine hydrochloride while simultaneously dissolving impurities from the reaction in said non-polar solvent,
   b. neutralizing the resulting reaction mixture by admixing it with an excess of aqueous alkali metal hydroxide solution sufficient to attain a final pH above about 11.5,
   c. separating the neutralized mixture into an organic solvent layer containing said non-polar solvent solution and an aqueous layer having dissolved therein the 4-nitrosodiphenylamine as its alkali metal salt together with a minor quantity of impurities,
   d. adding mineral acid to the material of the aqueous layer in a limited quantity such as to cause precipitation of the 4-nitrosodiphenylamine from its alkali metal salt without permitting the resulting slurry to become acidified and thereby retaining its impurities in solution in the liquid phase thereof, and
   e. separating the 4-nitrosodiphenylamine from the said liquid phase.

2. A method according to claim 1 in which the non-polar solvent is a member of the group consisting of benzene, toluene, xylene, monochlorobenzene, hexane, cyclohexane, trichloroethylene and carbon tetrachloride.

3. A method according to claim 1 in which the amount of non-polar solvent is about 0.1 to 1.5 times the weight of the N-nitrosodiphenylamine.

4. A method according to claim 1 in which the amount of alcohol is about two to six times the weight of the dry HCl.

5. A method according to claim 1 in which the material of the organic solvent layer of step (c) is distilled to recover the non-polar solvent for reuse.

6. A method according to claim 1 wherein the final pH of the slurry produced in step (d) is not lower than 11.5.

7. A method of producing a 4-nitrosodiphenylamine of high purity according to claim 1 which comprises the steps of:
   a. reacting under anhydrous conditions a 40–80 percent solution of one mole of N-nitrosodiphenylamine in toluene with a 15–35 percent solution of about 1.05 to 3 moles of dry HCl in anhydrous methanol at about 20°–40°C. and thereby converting the N-nitrosodiphenylamine to 4-nitrosodiphenylamine hydrochloride while simultaneously dissolving impurities from the reaction in said toluene.
   b. neutralizing the resulting reaction mixture by admixing therewith an excess of aqueous alkali metal hydroxide solution sufficient to attain a final pH above 11.5,
   c. separating the neutralized mixture into an upper toluene layer and a lower aqueous layer having dissolved therein the 4-nitrosodiphenylamine as its alkali metal salt together with a small quantity of impurities,
   d. adding mineral acid to the material of the aqueous layer in a limited quantity such as to cause precipitation of the 4-nitrosodiphenylamine from its alkali metal salt without reducing the pH of the resulting slurry below 11.5 and thereby retaining its impurities in solution in the liquid phase thereof, and
   e. separating the 4-nitrosodiphenylamine from the said liquid phase.

* * * * *